United States Patent
Gendou et al.

(10) Patent No.: US 7,523,851 B2
(45) Date of Patent: Apr. 28, 2009

(54) FRICTIONAL SPOT JOINING METHOD AND FRICTIONAL SPOT JOINING APPARATUS

(75) Inventors: Toshiyuki Gendou, Hiroshima (JP); Yukihiro Sugimoto, Hiroshima (JP); Katsuya Nishiguchi, Hiroshima (JP); Kenji Takase, Hiroshima (JP); Yohei Shoji, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 441 days.

(21) Appl. No.: 11/295,615

(22) Filed: Dec. 7, 2005

(65) Prior Publication Data
US 2006/0138198 A1 Jun. 29, 2006

(30) Foreign Application Priority Data
Dec. 24, 2004 (JP) ............................. 2004-373187

(51) Int. Cl.
*B23K 20/12* (2006.01)
(52) U.S. Cl. ..................................... 228/112.1; 228/2.1
(58) Field of Classification Search .............. 228/112.1, 228/2.1
See application file for complete search history.

(56) References Cited
U.S. PATENT DOCUMENTS
2002/0014516 A1* 2/2002 Nelson et al. ............ 228/112.1
2002/0190100 A1* 12/2002 Duncan, Jr. ............... 228/112.1
2003/0141343 A1* 7/2003 Murakami ................ 228/112.1
2003/0217994 A1* 11/2003 Ding ..................... 219/121.64
2005/0120535 A1 6/2005 Gendou et al.

FOREIGN PATENT DOCUMENTS
| EP | 1415752 A1 | 5/2004 |
| EP | 1477263 A1 | 11/2004 |
| JP | 2003-245782 | 9/2003 |
| JP | 2005059037 | 3/2005 |

OTHER PUBLICATIONS
European Search Report; EP 05027366; Jul. 31, 2008.
* cited by examiner

*Primary Examiner*—Kiley Stoner
*Assistant Examiner*—Erin B Saad
(74) *Attorney, Agent, or Firm*—Studebaker & Brackett PC; Donald R. Studebaker

(57) ABSTRACT

In the third step of joining of the metal members, the pressing force of the rotational tool under rotation is maintained at the third pressing force that is smaller than the second pressing force until a specified period of time elapses after the tip of the pin portion of the rotational tool has reached the specified point that is at a distance from the joining face. Accordingly, the proper plastic flow of the metal member can be generated and thereby the joining strength with a sufficient period of time of agitation can be ensured, by maintaining a high temperature enough to soften the metal member and by preventing the rotational tool from coming into the metal member too deeply or from penetrating the metal member.

6 Claims, 17 Drawing Sheets

|  | Joining Conditions |  |  |
|---|---|---|---|
|  | Pressing Force (kN) | Rotational Speed (rpm) | Pressing Period of Time (sec) |
| First Step | 1.47 | 3500 | 1.00 |
| Second Step | 3.92 | 2500 | 1.54 |
| Third Step | 0.98 | 2500 | 0 – 1.50 |

FIG. 20

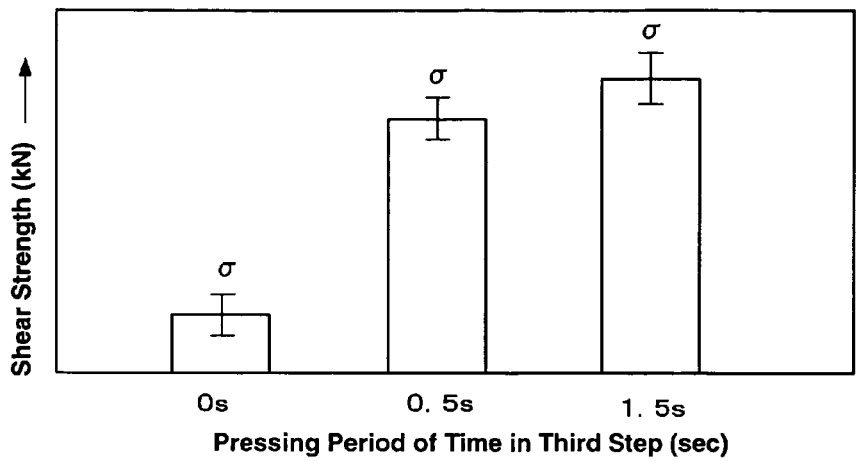

Pressing Period of Time in Third Step (sec)

FIG. 21

| Upper Plate (W1) | Lower Plate (W2) | | Pressing Force (kN) | | | Rotational Speed (rpm) | | | Joining Time (sec) | | |
|---|---|---|---|---|---|---|---|---|---|---|---|
| | | | First Step | Second Step | Third Step | First Step | Second Step | Third Step | First Step | Second Step | Third Step |
| 6000-based Alloy A (0.7 thick) | Zinc Plating Steel Plate (1.2 thick) | Test 1 | 1.47 | 1.47 | 0.98 | 3500 | 3000 | 3000 | 2.5 | 1.0 | 0.5 |
| | | Test 2 | 1.47 | 1.96 | 0.98 | 2500 | 2500 | 2500 | 2.5 | 1.0 | 0.5 |
| | | Test 3 | 1.47 | 2.21 | 0.98 | 2500 | 2500 | 2500 | 2.5 | 1.0 | 0.5 |
| | | Test 4 | 1.47 | 2.45 | 0.98 | 2500 | 2500 | 2500 | 2.5 | 1.0 | 0.5 |
| 6000-based Alloy A (0.8 thick) | Zinc Plating Steel Plate (1.2 thick) | Test 5 | 1.47 | 1.96 | 0.98 | 3500 | 3000 | 2000 | 1.0 | 1.2 | 1.9 |
| | | Test 6 | 1.47 | 2.21 | 0.98 | 3500 | 3000 | 2000 | 1.0 | 1.2 | 1.9 |
| | | Test 7 | 1.47 | 2.45 | 0.98 | 3500 | 3000 | 2000 | 1.0 | 1.2 | 1.9 |
| | | Test 8 | 1.47 | 2.70 | 0.98 | 3500 | 3000 | 2000 | 1.0 | 1.2 | 1.9 |
| | | Test 9 | 1.47 | 2.94 | 0.98 | 3500 | 3000 | 2000 | 1.0 | 1.2 | 1.9 |
| 6000-based Alloy B (1.4 thick) | Zinc Plating Steel Plate (1.0 thick) | Test 10 | 0.98 | 3.92 | 0.98 | 3500 | 2500 | 2500 | 1.0 | 1.5 | 2.4 |
| | | Test 11 | 1.96 | 3.92 | 0.98 | 3500 | 2500 | 2500 | 1.0 | 1.5 | 2.4 |
| | | Test 12 | 1.47 | 2.94 | 0.98 | 3500 | 2500 | 2500 | 1.0 | 1.5 | 2.4 |
| | | Test 13 | 1.47 | 3.43 | 0.98 | 3500 | 2500 | 2500 | 1.0 | 1.5 | 2.4 |
| | | Test 14 | 1.47 | 3.92 | 0.98 | 3500 | 2500 | 2500 | 1.0 | 1.5 | 2.4 |
| | | Test 15 | 1.47 | 4.41 | 0.98 | 3500 | 2500 | 2500 | 1.0 | 1.5 | 2.4 |
| | | Test 16 | 1.47 | 3.92 | 0.49 | 3500 | 2500 | 2500 | 1.0 | 1.5 | 2.4 |
| | | Test 17 | 1.47 | 3.92 | 0.98 | 3500 | 2500 | 2500 | 1.0 | 1.5 | 2.4 |
| | | Test 18 | 1.47 | 3.92 | 1.47 | 3500 | 2500 | 2500 | 1.0 | 1.5 | 2.4 |
| 6000-based Alloy A (1.4 thick) | Zinc Plating Steel Plate (1.0 thick) | Test 19 | 1.47 | 3.43 | 0.98 | 350 | 2500 | 2500 | 1.0 | 1.5 | 2.4 |
| | | Test 20 | 1.47 | 3.92 | 0.98 | 3500 | 2500 | 2500 | 1.0 | 1.5 | 2.4 |
| | | Test 21 | 1.47 | 4.41 | 0.98 | 3500 | 2500 | 2500 | 1.0 | 1.5 | 2.4 |
| | | Test 22 | 1.47 | 4.90 | 0.98 | 3500 | 2500 | 2500 | 1.0 | 1.5 | 2.4 |
| | | Test 23 | 1.47 | 5.39 | 0.98 | 3500 | 2500 | 2500 | 1.0 | 1.5 | 2.4 |
| | | Test 24 | 1.47 | 5.88 | 0.98 | 3500 | 2500 | 2500 | 1.0 | 1.5 | 2.4 |
| | | Test 25 | 3.43 | 4.90 | 0.98 | 3500 | 2500 | 2500 | 1.0 | 1.5 | 2.4 |

FIG. 22

|  | Shear Strength (kN) | Standard Strength (kN) | Joining Results | Note |
|---|---|---|---|---|
| Test 1 | 1.78 | 1.26 | OK | Shear Strength of 1.5 kN or more |
| Test 2 | 2.18 | | OK | |
| Test 3 | 2.73 | | OK | |
| Test 4 | - | | NG | Too-strong second step pressing pressure causes torn-off situation |
| Test 5 | 3.25 | 1.44 | OK | Shear Strength of 3.0 kN or more |
| Test 6 | 3.38 | | OK | |
| Test 7 | 3.18 | | OK | |
| Test 8 | - | | NG | Too-strong second step pressing pressure causes torn-off situation |
| Test 9 | - | | NG | Too-strong second step pressing pressure causes torn-off situation |
| Test 10 | - | | NG | Insufficiently-softened aluminum in the first step causes low joining strength |
| Test 11 | 3.39 | 2.11 | OK | Shear Strength of 2.4 kN or more |
| Test 12 | 2.42 | | OK | |
| Test 13 | 4.72 | | OK | |
| Test 14 | 4.66 | | OK | |
| Test 15 | 4.68 | | OK | |
| Test 16 | 4.18 | | OK | |
| Test 17 | 5.00 | | OK | |
| Test 18 | 3.30 | | OK | |
| Test 19 | 3.66 | 2.50 | OK | Shear Strength of 3.0 kN or more |
| Test 20 | 5.05 | | OK | |
| Test 21 | 4.87 | | OK | |
| Test 22 | 4.82 | | OK | |
| Test 23 | 4.88 | | OK | |
| Test 24 | 4.87 | | OK | |
| Test 25 | 5.17 | | OK | |

FIG. 23

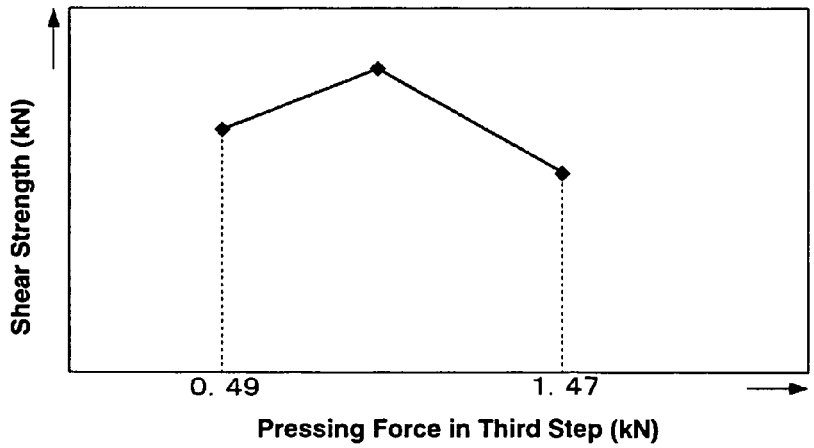

|  |  | Joining Conditions | | |
|---|---|---|---|---|
|  |  | Pressing Force (kN) | Rotational Speed (rpm) | Pressing Time (sec) |
| Test 51 | First Step | 1.47 | 1500 - 3500 | 1.00 |
|  | Second Step | 3.92 | 2500 | 1.54 |
|  | Third Step | 0.98 | 2500 | 2.40 |
| Test 52 | First Step | 1.47 | 3500 | 1.00 |
|  | Second Step | 3.92 | 1500 – 3500 | 1.54 |
|  | Third Step | 0.98 | 2500 | 2.40 |
| Test 53 | First Step | 1.47 | 3500 | 1.00 |
|  | Second Step | 3.92 | 3500 | 1.54 |
|  | Third Step | 0.98 | 1500 – 3500 | 2.40 |

FRICTIONAL SPOT JOINING METHOD AND FRICTIONAL SPOT JOINING APPARATUS

BACKGROUND OF THE INVENTION

The present invention relates to a frictional jointing, and in particular to a frictional joining technology in which different kinds of metal members that lap over are joined.

Members made of aluminum or aluminum alloy (hereinafter, referred to as "aluminum" simply) have been recently used as a body panel and the like of many automotive vehicles to reduce a vehicle weight. Accordingly, the joining of different kinds of metal members, such as aluminum and iron, or aluminum and steel, has been increasing. The frictional joining is also known as such a joining method. In this frictional joining, there is provided a work that is comprised of a first metal member, for example, that is made of aluminum alloy and a second metal member, for example, that is made of steel and has a higher melting point than the first metal member, which lap over. Then, a rotational tool is pushed against this work from a side of the first metal member, the first metal member is softened and made in a plastic flow state by a frictional heat generated via the rotational and pressing operation of the rotational tool, and so both metal members are joined in a solid state (joining in the solid state without melting) under a specified temperature that is lower than the melting point of the metal members.

Japanese Patent Application Laid-Open No. 2003-245782 discloses a certain spot joining technology. Herein, the rotational tool under rotation having its pin portion and shoulder portion is pushed against the work comprised of plural metal members at the high rotational speed and with the large pressing force at the initial stage in which only the pin portion contacts the work, so the generation of the frictional heat can be promoted. Meanwhile, the rotational tool under rotation is pushed at the low rotational speed and with the small pressing force at the terminal stage in which both the pin portion and the shoulder portion contact the work, so the proper agitation of the softened portion of the work can be promoted.

Also, the applicant has applied for a patent relating to the improved spot joining method and apparatus of the metal members in which the rotational tool is pushed with the stepwise increased pressing force to ensure the proper positioning of rotation by the pin portion of the rotational tool (U.S. patent application Ser. No. 11/000,063).

Meanwhile, in the case where different kinds of metal members, such as aluminum and steel, are joined, it is preferable in order to ensure the high joining strength that new uncovered surfaces of the metal members are exposed by pushing out the zinc plating layer existing on the joining boundary face from the joining portion of the members or by destroying the oxidation film. In order to do so, the metal member into which the rotational tool comes needs to be softened sufficiently and the plastic flow is generated. Here, in order to properly generate the plastic flow, it is necessary to promptly increase the heat generated at the joining portion to a temperature that can soften the metal member, and then to maintain the increased temperature for a while so that the continuous plastic flow of the metal member can be ensured. Herein, the invention of the above-described patent application is appropriate in order to promptly increase the temperature of the joining portion to the temperature to soften the metal member, because the considerably high pressing pressure is required. However, there are following concerns.

Namely, a certain period of time of agitation by the rotational tool under a relatively high pressing force at the terminal stage with both the pin portion and the shoulder portion of the rotational tool pushed into the metal member to generate the proper plastic flow at the metal member would cause an improper situation in which the rotational tool comes into the upper aluminum plate too deeply, so that the thickness of part of the aluminum existing between the tip of the rotational tool and the lower steel plate (remaining thickness) becomes too thin. Eventually, there would occur a situation in which the aluminum plate has been torn off. As a result, an aluminum loss would happen at the joining portion, and thus there would occur problems of galvanic corrosion or joining-strength decrease due to a difference in electric potential between the aluminum and the steel at this aluminum-loss portion. Also, the torn-off aluminum is attached to the rotational tool, which would prevent the rotational tool from properly operating for joining at subsequent joining portions. Further, the rotational tool penetrates the upper aluminum plate, and reaches the joining boundary face, hitting against the lower steel plate. As a result, the tip of the pin portion of the rotational tool would be worn improperly.

SUMMARY OF THE INVENTION

The present invention has been devised in view of the above-described problems of the joining of different kinds of metal members that lap over. An object of the present invention is to generate the proper plastic flow of the metal member and thereby to ensure the joining strength with a sufficient period of time of agitation, by maintaining a high temperature enough to soften the metal member and by preventing the rotational tool from coming into the metal member too deeply or from penetrating the metal member.

According to the present invention, there is provided a frictional spot joining method of metal members, in which a work comprising a first metal member and a second metal member that lap over is provided, a melting point of the second metal member being higher than that of the first metal member, and a rotational tool is pushed against the work from a side of the first metal member and the first metal member is softened and made in a plastic flow state by a frictional heat generated through a rotational and pressing operation of the rotational tool, the frictional spot joining method comprising a step of providing the rotational tool that comprises a shoulder portion to face the work and a pin portion that is located on a rotational axis of the rotational tool and projects toward the work from the shoulder portion, a first step of pushing the rotational tool under rotation with a first pressing force until the first metal member is softened by the rotational tool whose pin portion or both pin portion and shoulder portion come into the first metal member, a second step of pushing the rotational tool under rotation with a second pressing force that is greater than the first pressing force until a tip of the pin portion of the rotational tool reaches a specified point that is at a distance from a joining face of the first and second metal members, and a third step of maintaining the pressing force of the rotational tool under rotation at a third pressing force that is smaller than the second pressing force until a specified period of time elapses after the tip of the pin portion has reached the specified point that is at a distance from the joining face.

Thereby, the first metal member starts to be softened by the frictional heat in the first step, and in the second step, the temperature of the joining portion is promptly increased to the high temperature enough to soften the first metal member by the frictional heat and the plastic flow of the first metal member starts. Then, in the third step, since the pressing force is maintained at the low pressing force, the rotational tool can be prevented from coming into the metal member too deeply and the rotational tool can be held in the specified location.

Accordingly, the high temperature enough to soften the first metal member can be maintained and thereby the proper plastic flow of the first metal member can be ensured, preventing the torn-off situation of the first metal member or the penetration of the rotational tool through the metal member. Thus, the proper plastic flow of the metal member can be maintained for a sufficiently long period of time in the third step, thereby ensuring the joining strength.

According to an embodiment of the present invention, the first pressing force is 1.47 kN or more and 3.43 kN or less, the second pressing force is 1.74 kN or more and 5.88 kN or less, and the third pressing force is 0.49 kN or more and 1.47 kN or less. Thereby, since the pressing forces in the respective steps are specifically defined, the effect described above can be surely obtained.

According to another embodiment of the present invention, the rotational tool is rotated at a specified rotational speed within a middle rotational speed through a high rotational speed in the first step, at the middle rotational speed in the second step, and at a specified rotational speed within a low rotational speed through the high rotational speed in the third step. Thereby, the first metal member can surely start to be softened by the frictional heat in the first step, the proper agitation of the softened portion of the metal member can be obtained in the second step, and the proper plastic flow can be maintained for a long period of time regardless of the rotational speed in the third step.

Herein, it is preferable that the rotational tool is rotated at a specified speed that is more than 2000 rpm and 3500 rpm or less in the first step, at a specified speed that is more than 2000 rpm and 3000 rpm or less in the second step, and at a specified speed that is 1500 rpm or more and 3500 rpm or less in the third step.

According to another embodiment of the present invention, the rotational tool comprises a ring-shaped concave that is formed at the shoulder portion around the pin portion. Thereby, since the rotational tool with the ring-shaped concave formed at the shoulder portion around the pin portion is used, the first metal member in the plastic flow state is prevented from flowing out from the portion right below the rotational tool and thereby the pressing force of the rotational tool is concentrated upon the portion right below the rotational tool. As a result, the plastic flow of the first metal member can be promoted.

Herein, it is preferable that the ring-shaped concave formed at the shoulder portion is a recess with a cone shape that has a center thereof aligning with the rotational axis of the rotational tool.

According to another embodiment of the present invention, the first metal member is made of aluminum alloy, the second metal member is made of steel, and both metal members are joined in a solid state at a joining boundary face thereof. Thereby, since the plastic flow is generated in the first metal member with the lower melting point, the energy necessary to join the first and second metal members can be kept smaller and the joining time can be kept shorter.

According to the present invention, there is further provided a frictional spot joining apparatus of metal members, in which a work comprising a first metal member and a second metal member that lap over is provided, a melting point of the second metal member being higher than that of the first metal member, and a rotational tool is pushed against the work from a side of the first metal member and the first metal member is softened and made in a plastic flow state by a frictional heat generated through a rotational and pressing operation of the rotational tool, wherein the rotational tool comprises a shoulder portion to face the work and a pin portion that is located on a rotational axis of the rotational tool and projects toward the work from the shoulder portion, and the frictional spot joining apparatus comprises a rotating device to rotate said rotational tool, a moving device to move and push the rotational tool relative to the work, and a pressing force control device to operate the rotating device and the moving device so that the rotational tool under rotation is pushed with a first pressing force until the first metal member is softened by the rotational tool whose pin portion or both pin portion and shoulder portion come into the first metal member, the rotational tool under rotation is pushed with a second pressing force that is greater than the first pressing force until a tip of the pin portion of the rotational tool reaches a specified point that is at a distance from a joining face of the first and second metal members, and the pressing force of the rotational tool under rotation is maintained at a third pressing force that is smaller than the second pressing force until a specified period of time elapses after the tip of the pin portion has reached the specified point that is at a distance from the joining face.

The above-described invention provides an apparatus that can obtain substantially the same effects as those by the above-described method.

Other features, aspects, and advantages of the present invention will become apparent from the following description which refers to the accompanying drawings.

BRIEF DESCRIPTION OF THE DRAWINGS

FIG. 20 is a graph of measurement results of the draw-shear testing.

FIG. 21 is a table of joining conditions for shear-strength testing with respect to four samples.

FIG. 22 is a table showing measurement results of the shear-strength testing for the four samples.

FIG. 23 is a graph showing relationships between the pressing force in the third step and the shear strength.

DETAILED DESCRIPTION OF THE INVENTION

Figure 1:
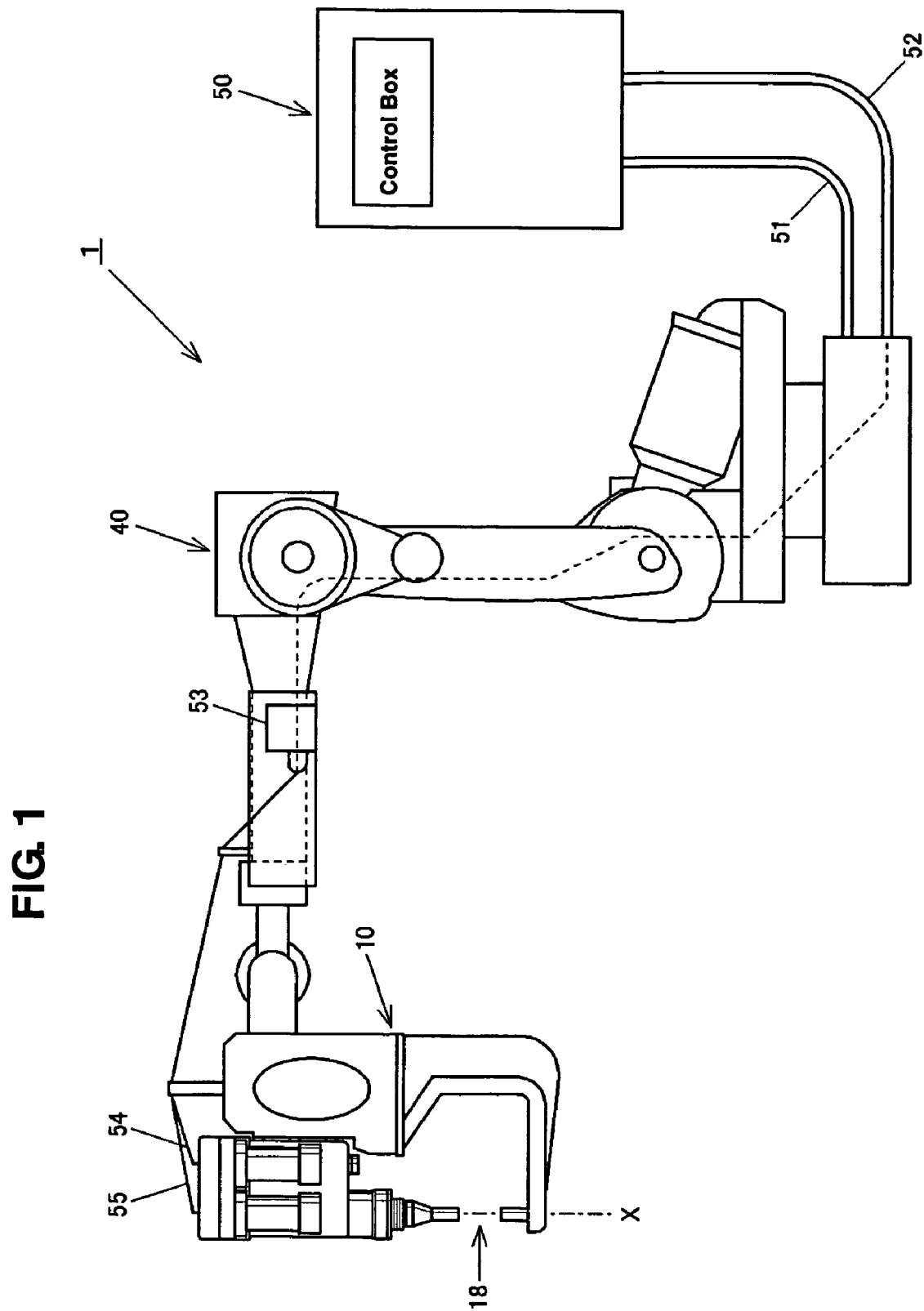
FIG. 1 is a schematic side view of a frictional spot joining apparatus according to an embodiment of the present invention.

Hereinafter, a preferred embodiment will be described referring to the accompanying drawings. FIG. 1 is a schematic elevation view of a frictional spot joining apparatus 1 according to the present embodiment. The frictional spot joining apparatus 1 is used for joining of aluminum members or a aluminum member and a steel member of, for example, a body of an automotive vehicle and the like. This apparatus comprises a joining gun 10 and a robot 40 having the joining gun 10 at its hand as a major component. A six-axis multiple-articulated type of robot which has been used widely may be preferably used as the robot 40.

Figure 2:
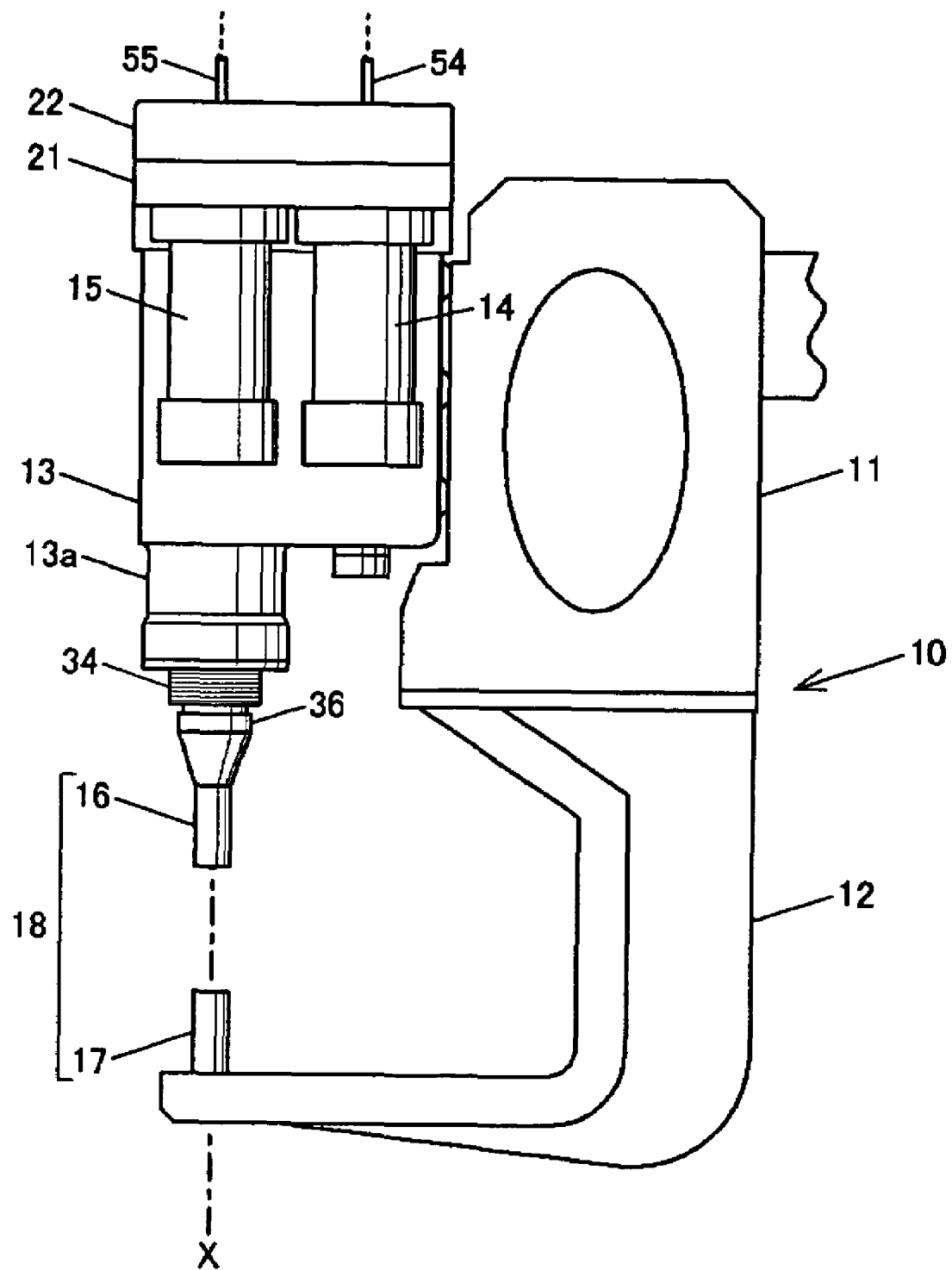
FIG. 2 is an enlarged side view of a joining gun and a portion around the joining gun of the frictional spot joining apparatus.
Figure 3:
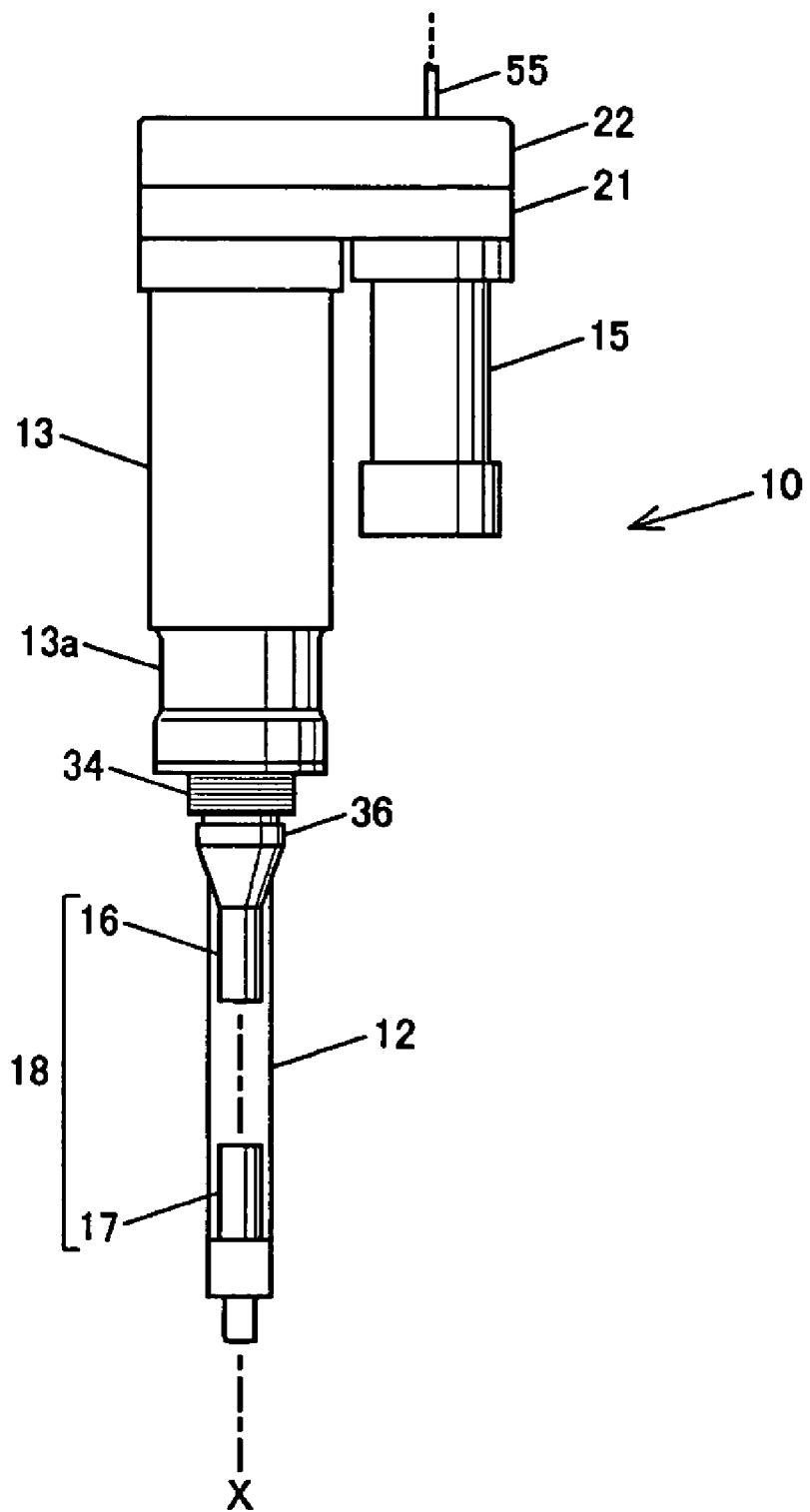
FIG. 3 is an enlarged elevation view of the joining gun and the portion around the joining gun of the frictional spot joining apparatus.

As illustrated in FIGS. 2 and 3, the joining gun 10 comprises an attaching box 11 attached to the robot 40, a L-shaped arm 12 extending downward from the bottom of the attaching box 11, a body case 13 fixed to the side of the attaching box 11 above the arm 12, a pressing motor 14, and a rotating motor 15. At the lower end of the body case 13 is provided a rotational tool 16 constituting part of a joining tool 18. Meanwhile, a receiving member 17 constituting the other part of the joining tool 18 is fixed to the tip of the arm 12 and located right below the rotational tool 16, facing the rotational tool 16.

Figure 4:
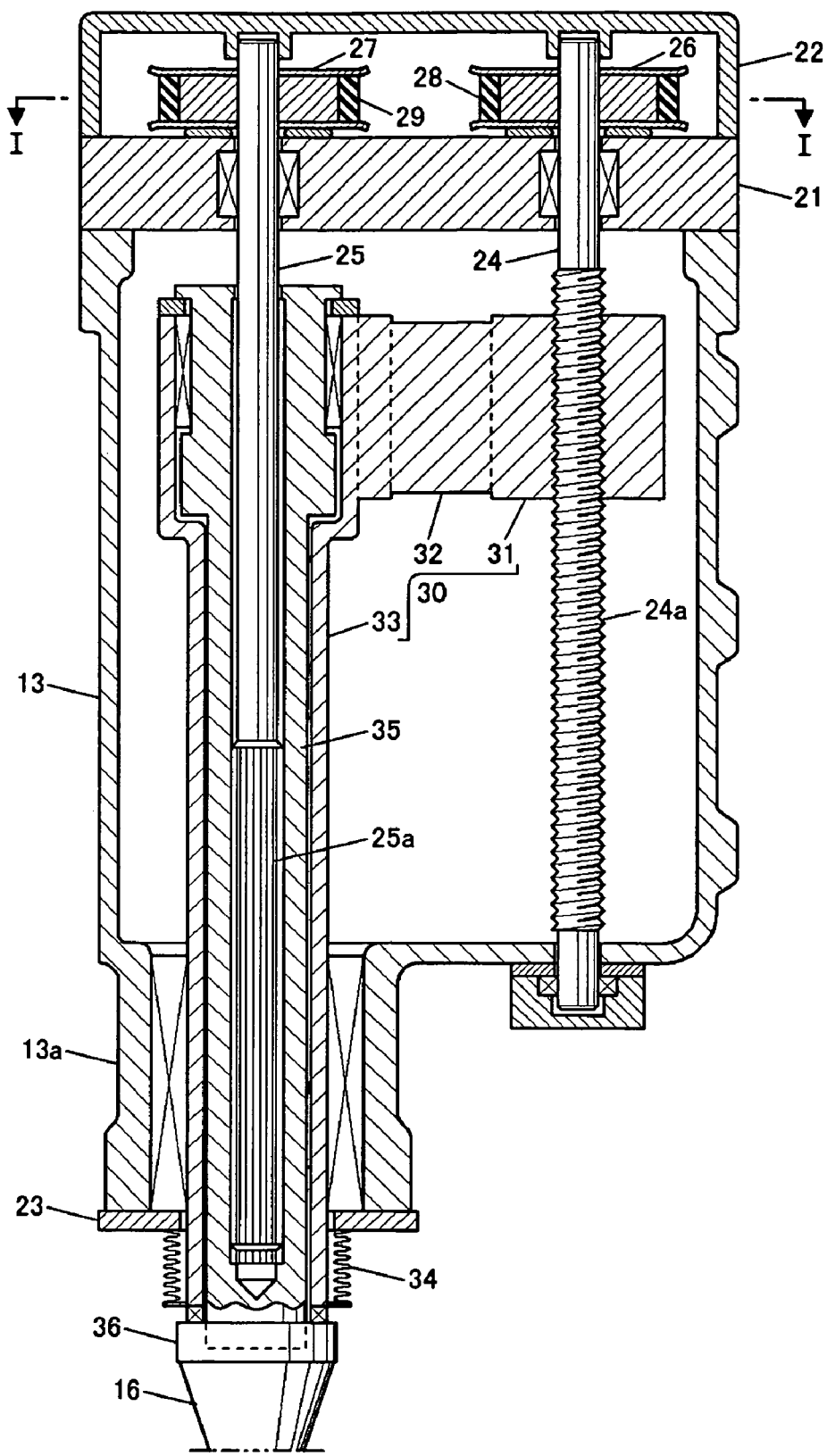
FIG. 4 is an enlarged sectional view of an internal structure of a body case of the joining gun, viewed from the same direction as that in FIG. 2.
Figure 5:
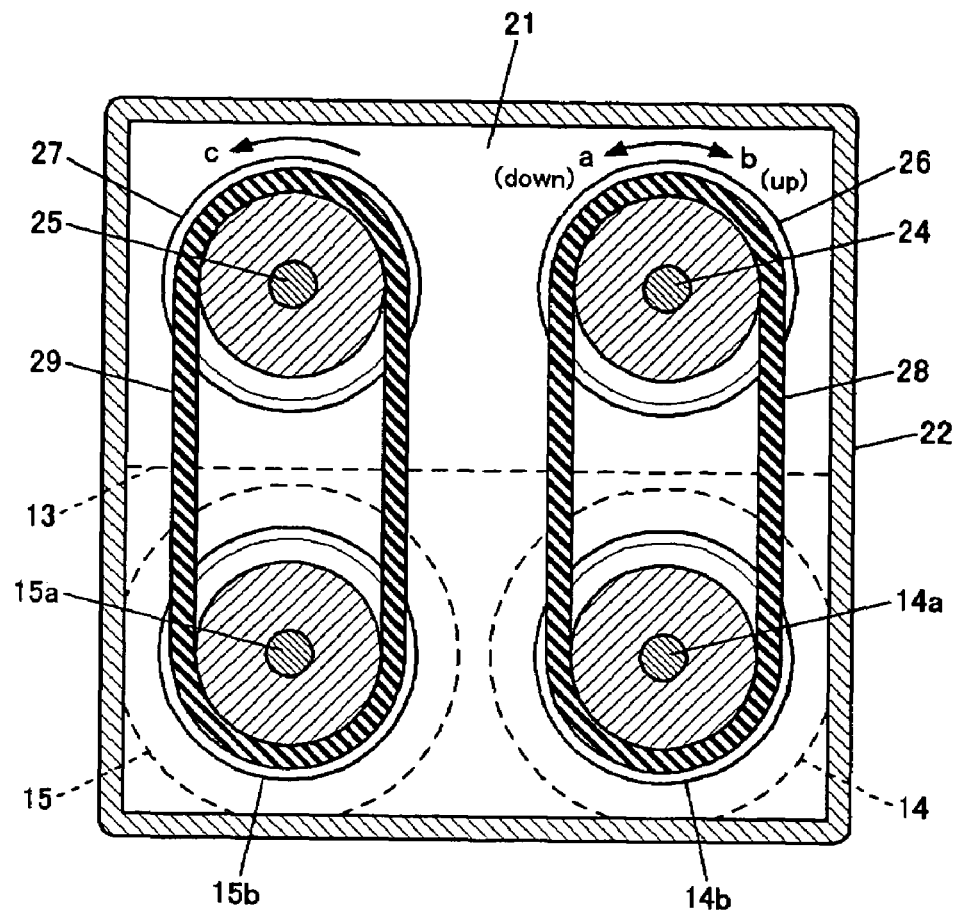
FIG. 5 is a sectional view taken along line I-I of FIG. 4.

As further illustrated in FIG. 4, in the body case 13 are provided a screw shaft (going-up-and-down shaft) 24 and a spline shaft (rotational shaft) 25, which extend vertically in parallel and rotate, respectively. The shafts 24, 25 extend upward, penetrating an upper cover member 21, and their upper ends are located inside an upper cover 22, where driven pulleys 26, 27 are attached to them. Meanwhile, as illustrated in FIG. 5, the upper cover member 21 projects from the upper of the body case 13 toward the side of the body case 13 (see FIG. 3), and to this projecting portion are fixed the pressing motor 14 and the rotating motor 15. Herein, output shafts 14a, 15a of the motors 14, 15 extend upward, penetrating the upper cover member 21, and their upper ends are located inside the upper cover 22, where drive pulleys 14b, 15b are attached to them. Belts for transmitting a drive power 28, 29 are provided between the drive pulleys 14b, 15b and the driven pulleys 26, 27, respectively. The screw shaft 24 is driven by the pressing motor 14 so as to rotate in a direction of a, b, while the spline shaft 25 is driven by the rotating motor 15 so as to rotate in a direction of c.

Returning to FIG. 4, a moving block 31 engages with a thread portion 24a of the screw shaft 24, and a rotational cylinder 35 is connected to a spline portion 25a of the spline shaft 25 via spline connection. The rotational cylinder 35 is rotatably supported in a moving cylinder 33 that is integrally coupled to the moving block 31 via a coupling member 32. A cylindrical lower projection 13a is formed at the bottom of the body case 13. At the lower end of the lower projection 13a is provided a lower cover 23, and the lower end of the moving cylinder 33 and the rotational cylinder 35 project downward beyond the lower cover 23. Herein, the inside rotational cylinder 35 projects downward further below the outside moving cylinder 33, and an attaching member 36 is fixed to the tip of the rotational cylinder 35. The rotational tool 16 is attached to the attaching member 36 detachably (to be replaceable). Herein, between the lower cover 23 and the moving cylinder 33 are provided an expandable bellows 34 so as to prevent an outer peripheral face of the moving cylinder 33 from becoming dirty.

In the structure described above, when the screw shaft 24 is driven by the rotation of the pressing motor 14 so as to rotate in the direction of a in FIG. 5, the moving member 30 (including the moving block 31, the coupling member 32 and the moving cylinder 33) goes downward via its engagement with thread portion 24a, so the rotational cylinder 35 in the moving cylinder 33 and the rotational tool 16 go down together. Meanwhile, when the screw shaft 24 is driven by the rotation of the pressing motor 14 so as to rotate in the direction of b in FIG. 5, the moving member 30 goes upward via its engagement with thread portion 24a, so the rotational cylinder 35 in the moving cylinder 33 and the rotational tool 16 go up together. Also, when the spline shaft 25 is driven by the rotation of the rotating motor 15 so as to rotate in the direction of c in FIG. 5, the rotational cylinder 35 rotates in the same direction of c via the spline connection with the spline portion 25a regardless of the movement of the moving member 30 described above, so the rotational tool 16 coupled to the rotational cylinder 35 rotates in the same direction of c together. Herein, the rotational axis of the rotational tool 16 is shown by reference character X in FIGS. 1 through 3.

Herein, a servomotor, which is easy to control and detect the rotational angle, is preferable as the pressing motor 14. This servomotor or another type of induction motor that is easy to control the rotational speed is preferable as the rotating motor 15.

Figure 6:
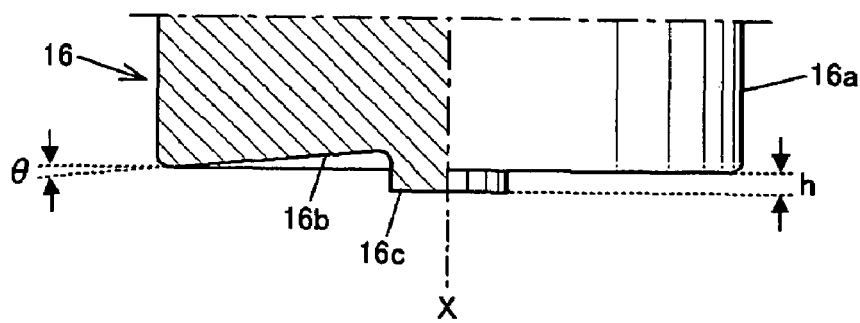
FIG. 6 is an enlarged view illustrating a structure of a tip of a rotational tool used for the frictional spot joining apparatus.

FIG. 6 illustrates the tip of the rotational tool 16. The rotational tool 16 is especially designed so as to be suitable to the different kinds of metal members (aluminum and steel, for example), in which the lower end face (circular shape) of the cylindrical body 16a is constituted as a shoulder portion 16b to press the metal member. Herein, the shoulder portion 16b is formed to be not flat, but slant with a specified angle ($\phi$), so that it comprises a recess with a cone shape that has its center aligning with the rotational axis X (one example of a ring-shaped concave in the claim: this may be also formed of a recess with a curved slant surface toward the rotational axis X). A cylindrical pin portion 16c is formed at the center of the shoulder portion 16b, projecting from the lower end, i.e., the peripheral edge, of the shoulder portion 16b with a specified length (h). Specifically, the diameter of the shoulder portion 16b is 10 mm, the diameter of the pin portion 16c is 2 mm, the slant angle ($\phi$) of the shoulder portion 16b is 5°-7°, and the projecting length (h) of the pin portion 16c is 0.35 mm or 0.3 mm, for example.

As illustrated in FIG. 1, the robot 40 is coupled to a control box 50 via a harness 51. The joining gun 10 is coupled to the control box 50 via harnesses 52, 54, 55 and a junction box 53. The operations of the pressing motor 14 and the rotating motor 15 are controlled by a control unit, not illustrated, in the control box 50.

Figure 7:
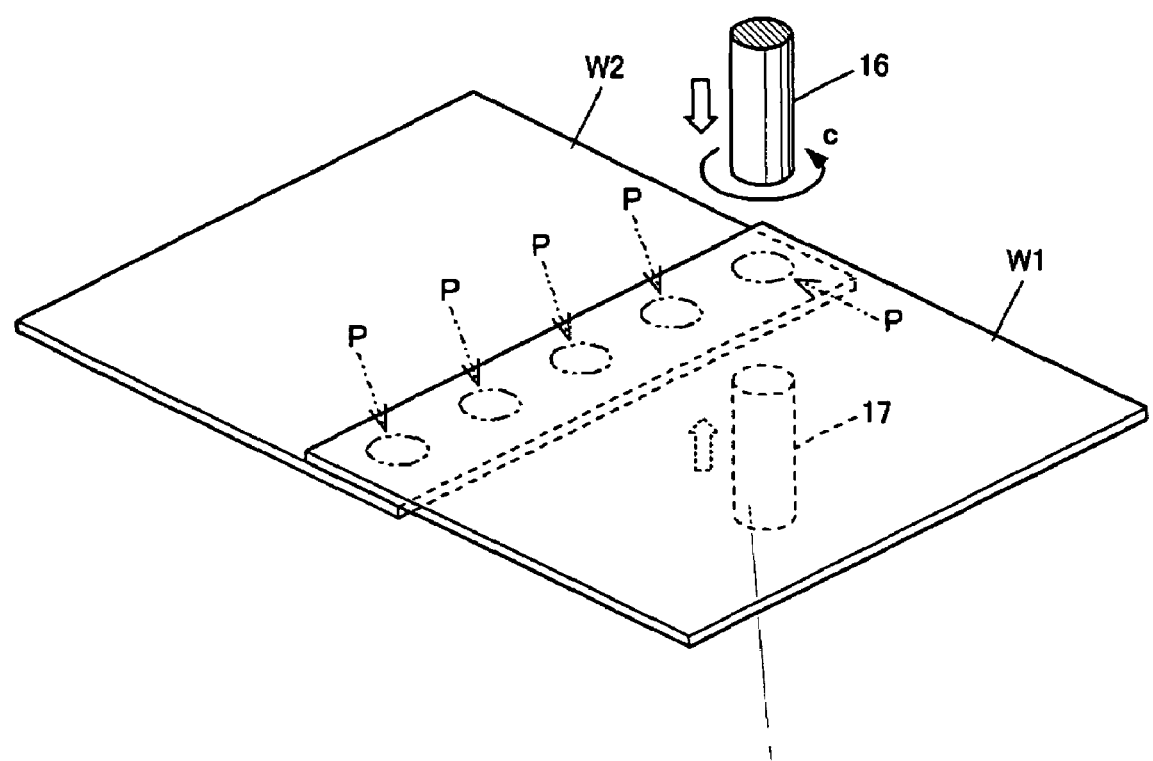
FIG. 7 is a perspective view illustrating an operation of frictional joining at a joining portion of two metal members that lap over and are disposed between the rotational tool and a receiving member of the frictional spot joining apparatus.

And, as illustrated in FIG. 7, in the present embodiment, a first metal member W1 (aluminum plate, for example) with a relatively low melting point is located as the upper plate, and a second metal member W2 (steel plate, for example) with a relatively high melting point is located as the lower plate. These plates W1, W2 are placed so as to lap over, and constitute a work, which is fixed with a proper fixing means, not illustrated. Next, the robot 40 moves the joining gun 10 toward the work, and stops the gun's moving. Herein, the rotational tool 16 is positioned above the work, and the receiving member 17 is located below the work. At first, the joining gun 10 is moved upward, and the receiving member 17 contacts the lower face of the second metal member W2. Then, the rotational toll 16 under rotation is lowered toward the work, and then pressed against the first metal member W1. Thereby, the first metal member W1 is softened by the frictional heat that is generated by the rotational and pressing operations of the rotational tool 16 to generate the plastic flow. Thus, the both metal members W1, W2 are joined in the solid state.

In this joining, as described above, the first metal member W1 is softened by the frictional heat generated by the rotational and pressing operations of the rotational tool 16 to generate the plastic flow, and thereby the first metal member W1 with the relatively low melting point and the second metal member W2 with the relatively high melting point are joined. Accordingly, the plastic flow is generated at the first metal member W1 with the relatively low melting point, thus the energy necessary to join these metal members W1, W2 can be kept smaller and the joining period of time can be kept shorter.

After the joining at one portion P has been done, the rotational tool. 16 is moved up and then the joining gun 10 is lowered. Subsequently, the joining gun 10 is moved laterally by a specified distance. Then, again the joining gun 10 is moved upward, and the rotational tool 16 is moved downward for the joining as described above. Thus, the frictional joining of the metal members W1, W2 is executed at plural portions P . . . P.

Figure 8:
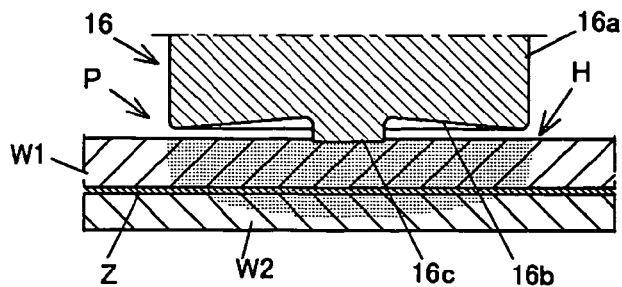
FIG. 8 is an enlarged sectional view illustrating a pressing state in the first step in which the rotational tool under rotation of the frictional spot joining apparatus is pressed against an upper plate, whose only pin portion comes into the upper plate.

More specifically, in the first step pressing illustrated in FIG. 8 ("the first step" in the claims) in which only the lowered tip of the pin portion 16c of the rotational tool 16 contacts the first metal member W1 (corresponding to the period of time t1-t2 in FIG. 12 that will be described below), the frictional heat H is generated at the joining portion and diffused outward. The first metal member W1 and the zinc plating layer Z on the surface of the second metal member W2, which has been coated to protect it from oxidation, start to be softened by the above-described frictional heat H at the joining portion.

Herein, the rotational tool 16 is pressed against the first metal member W1 with the first pressing force that is relatively small, so the proper positioning of rotation by the pin portion 16c can be obtained. Both the tip of the pin portion 16c and a peripheral edge portion of the shoulder portion 16b may be contacted against the first metal member W1 to generate the frictional heat H in the above-described first step.

Figure 9:
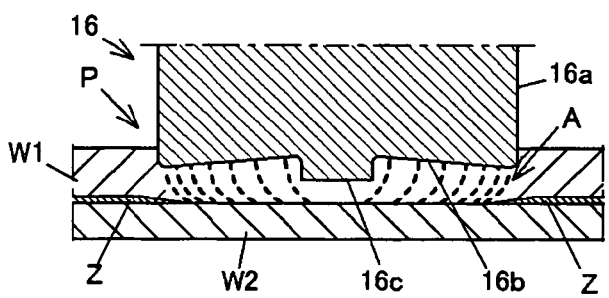
FIG. 9 is an enlarged sectional view illustrating a pressing state in the second step in which the rotational tool under rotation of the frictional spot joining apparatus is pressed against the upper plate, whose both the pin portion and a shoulder portion come into the upper plate.

Subsequently, in the second step pressing illustrated in FIG. 9 ("the second step" in the claims) in which the rotational tool 16 is further lowered and the tip of the shoulder portion 16b comes into the first metal member W1 (corresponding to the period of time t2-t3 in FIG. 12), the frictional heat H is generated more because of the rotation and pressing of the wide shoulder portion 16b in addition to the pin portion 16c. Accordingly, the first metal member W1 is further softened enough to generate the plastic flow (A). Herein, since the shoulder portion 16b of the rotational tool 16 comprises the recess with the cone shape that has its center aligning with the rotational axis X, the first metal member W1 in the plastic flow state is prevented properly from flowing out from the portion right below the rotational tool 16. As a result, the pressing force of the rotational tool 16 is concentrated upon the portion right below the rotational tool 16, thus the plastic flow of the first metal member W1 can be promoted.

At this stage, the rotational tool 16 is pushed against the first metal member W1 with the second pressing force that is larger than the above-described first pressing force. Thus, after the first metal member W1 has been softened to some degree by the frictional heat generated by the first pressing force, the rotational tool 16 is further pushed with the higher second pressing force. As a result, the plastic flow can be surely generated at the first metal member W1. And, the softened zinc plating layer Z is pushed out from the joining portion P by the pressing of the rotational tool 16 and the plastic flow of the first metal member W1, so a new uncovered surface of the second metal member W2 is exposed at the joining boundary face of the metal members W1, W2 (the upper surface of the second metal member W2). And, the oxidation film, not illustrated, that has been formed at the surface of the first metal member W1 by oxygen in the air is destroyed at the joining portion P, so a new uncovered surface of the first metal member W1 is exposed at the joining boundary face of the metal members W1, W2 (the lower surface of the first metal member W1).

Figure 10:
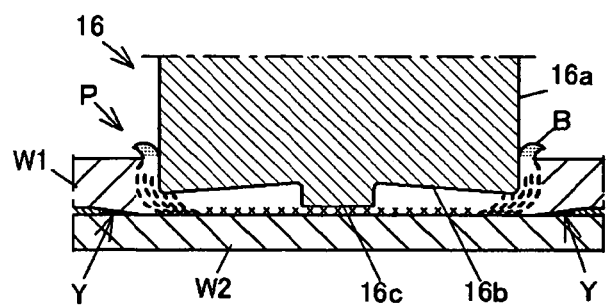
FIG. 10 is an enlarged sectional view illustrating a pressing state in the third step in which the rotational tool continues to soften the upper plate so as to generate a plastic flow, being prevented from coming into the upper plate.

Next, in the third step pressing illustrated in FIG. 10 ("the third step" in the claims) in which the rotational tool 16 is further lowered and the shoulder portion 16b comes into the first metal member W1 deeply (corresponding to the period of time t3-t4 in FIG. 12), the metal material pushed out by the rotational tool 16 rises as projections B. And, the zinc plating layer Z is further pushed out from the joining portion P, and the oxidation film is further destroyed. Thus, the new uncovered surfaces of the first and second metal members W1, W2 are exposed widely (to an extent X in the figure). As a result, the joining strength of frictional spot joining (joining in the solid state) of the metal members W1, W2 can be improved.

Herein, the long term pressing with the second pressing force makes the first metal member W1 be softened too much would cause an improper situation in which the rotational tool 16 comes into the first metal member W1 too deeply, so that the thickness of part of the first metal member W1 existing between the rotational tool 16 and the second metal member W2 becomes too thin. Eventually, there would occur a situation in which the first metal member W1 is torn off. As a result, there would occur a problem that the contacting area between the first and second metal members W1, W2 reduces and thereby the joining-strength decreases. Also, the pin portion 16c of the rotational tool 16 would penetrate the upper first metal member W1 and hit against the lower second metal member W2. As a result, a hole would be formed by the pin portion 16c at the first metal member W1, which may cause a problem of galvanic corrosion due to difference in electric potential between the aluminum and steel at this portion.

Accordingly, the third pressing force that is smaller than the second pressing force is used in the third step to prevent the rotational tool 16 from coming into the first metal member W1 too deeply. Thus, the plastic flow is generated at the first metal member W1 while the temperature of the first metal member W1 is maintained at the temperature in the second step pressing. Thereby, the pin portion 16c is prevented from hitting against the second metal member W2, so the problems such as the torn-off situation and the galvanic corrosion are avoided.

Herein, a metal compound based on the metal of the first metal member W1 and the metal of the zinc plating layer Z is formed at a portion of the zinc plating layer Z (Y).

Figure 11:
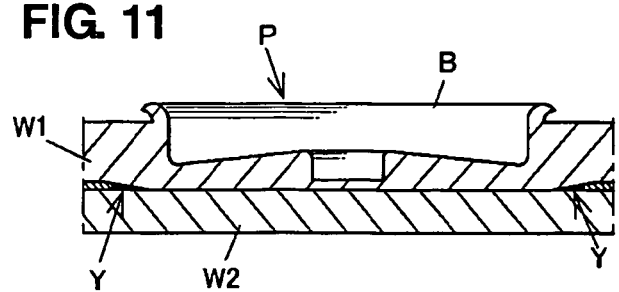
FIG. 11 is an enlarged sectional view illustrating the joining portion of the frictional spot joining.
Figure 12:
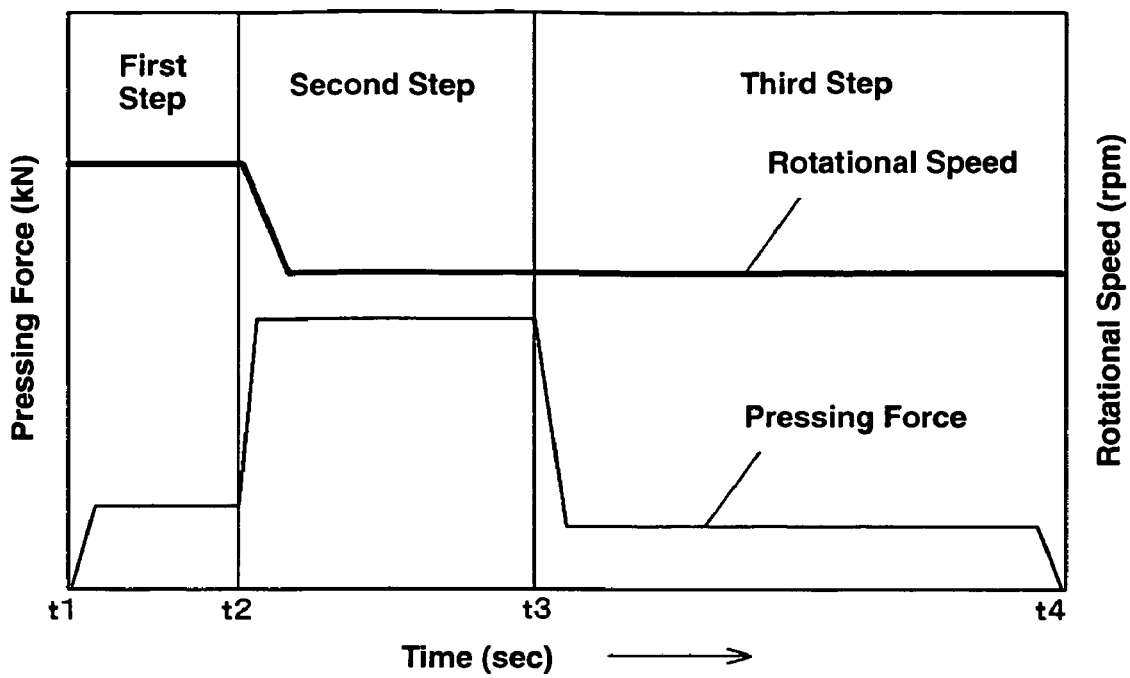
FIG. 12 is a graph showing an exemplified change of the rotational speed and the pressing force of the rotational tool in the first, second and third steps.

As illustrated in FIG 11, when the rotational tool 16 has been moved up after the joining, spot marks by the shoulder portion 16b and the pin portion 16c remain on the surface of the work at the joining portion P, which is enclosed by the projections B. FIG. 12 shows an exemplified change of the rotational speed and pressing force of the rotational tool 16 in the first, second and third steps.

Figure 13:
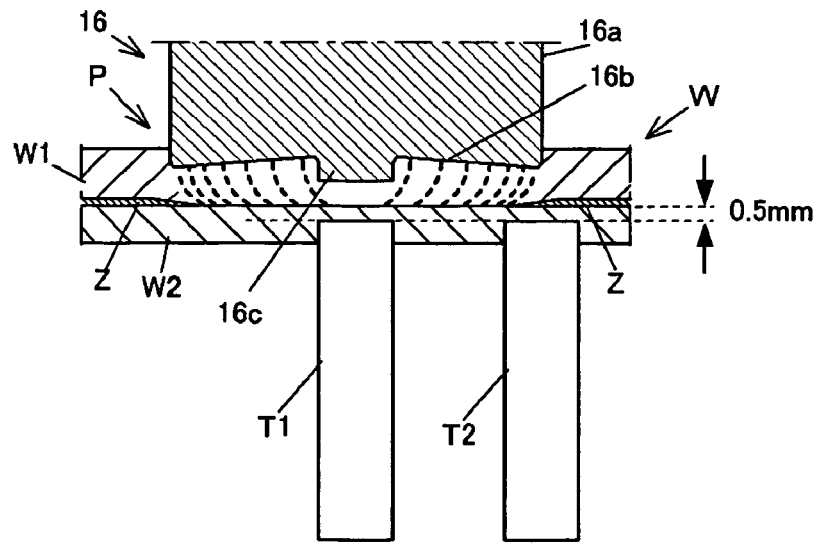
FIG. 13 is an enlarged view illustrating a state in which the temperature around the joining portion of the work is measured by thermocouples.

As illustrated in FIG. 13, the temperature change was measured for the work comprising the first metal member W1 as the upper plate and the second metal member W2 as the lower plate, at measuring points of the center and the end portions of the joining portion P, with two thermocouples T1, T2 that are inserted from the second metal member W2 and placed at portions 0.5 mm away from the zinc plating layer Z at the above-described measuring points, for two cases, in which the third step pressing was done and the third step pressing was not done. Herein, a 6000-based aluminum alloy (with copper, 1.4 mm thick) was used as the upper plate W1, and a zinc plating steel plate (1.0 mm thick) was used as the lower plate W2. Joining conditions are as follows: the pressing force of 1.47 kN, the rotational speed of 3500 rpm, the pressing period of time of 1.0 sec for the first step pressing (for pressing in the first step); the pressing force of 4.90 kN, the rotational speed of 1500 rpm, the pressing period of time of 1.54 sec for the second step pressing (for pressing in the second step); and the pressing force of 0.98 kN, the rotational speed of 2500 rpm, the pressing period of time of 2.4 sec for the third step pressing (for pressing in the third step). The results are shown in graphs of FIGS. 14 and 15.

Figure 14:
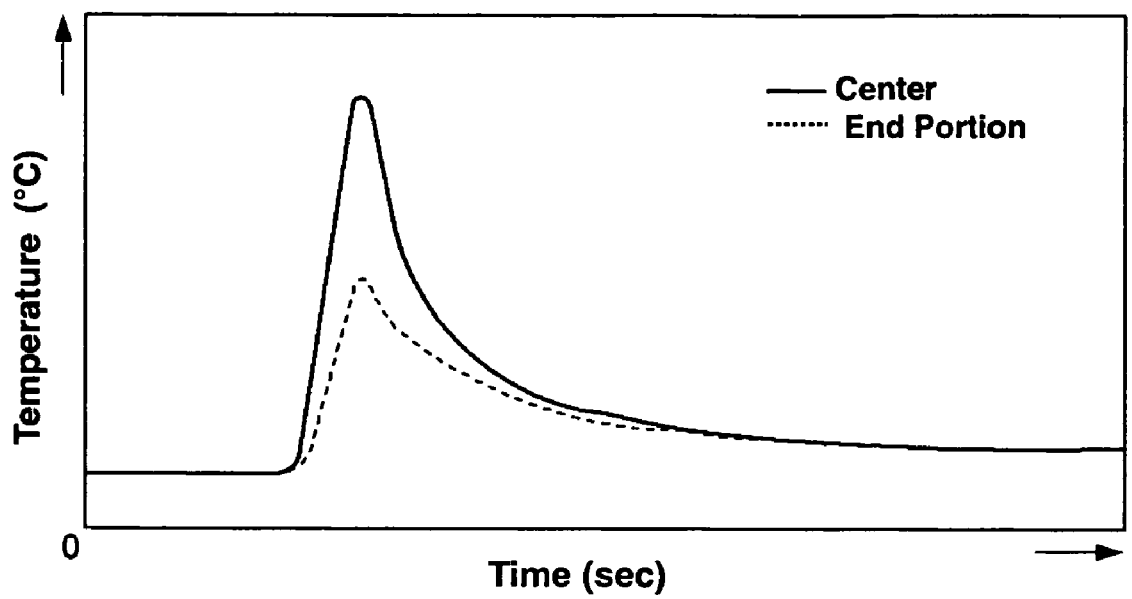
FIG. 14 is a graph showing results of temperature measurement at the center and the end portion of the joining portion in the case where the third step pressing was not done.

As illustrated in FIG. 14, it was found that in the case where the third step pressing was not done, the temperature at the center and the end portions of the joining portion P in the second step pressing increased to a temperature that is high enough to soften the first metal member W1 to generate the plastic flow, and then decreased after the second step pressing.

Figure 15:
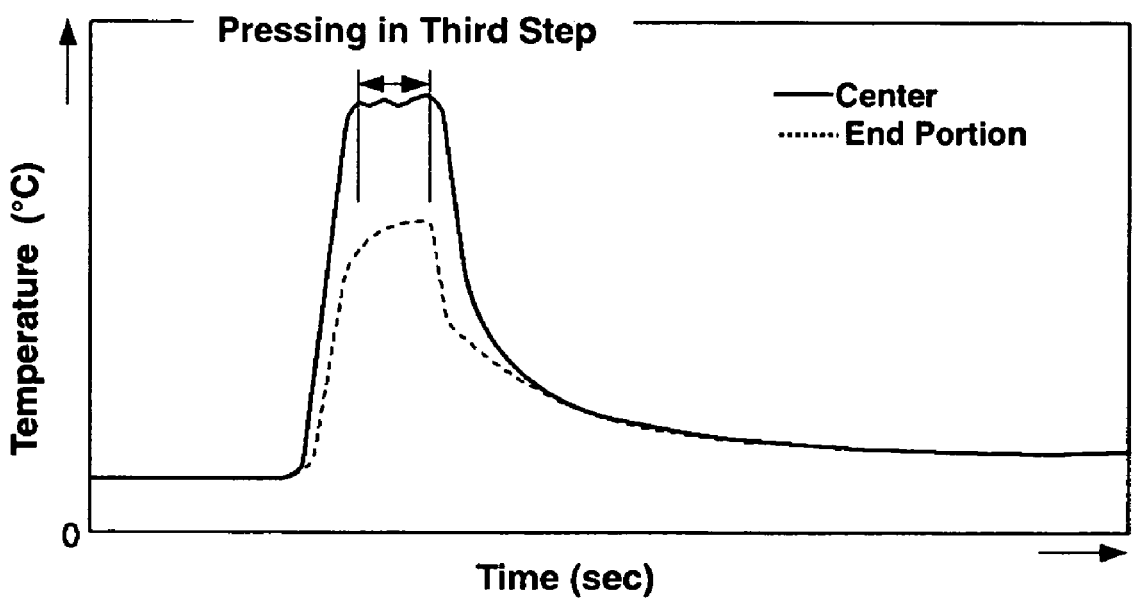
FIG. 15 is a graph showing results of the temperature measurement at the center and end portions of the joining portion in the case where the third step pressing was done.

Meanwhile, as illustrated in FIG. 15, it was found that in the case where the third step pressing was done, the temperature at the joining portion P in the second step pressing increased to a temperature that is high enough to soften the first metal member W1 to generate the plastic flow, and then was maintained for a certain period of time and subsequently decreased.

As a result, conducting the third step pressing after the second step pressing can provide the long period of time of joining of the metal members W1, W2 with the proper plastic flow of the first metal member W1, and avoid the torn-off situation by preventing the rotational tool 16 from coming into too deeply and penetrating the first metal member W1, thereby ensuring the joining strength.

Figures 16, 17:
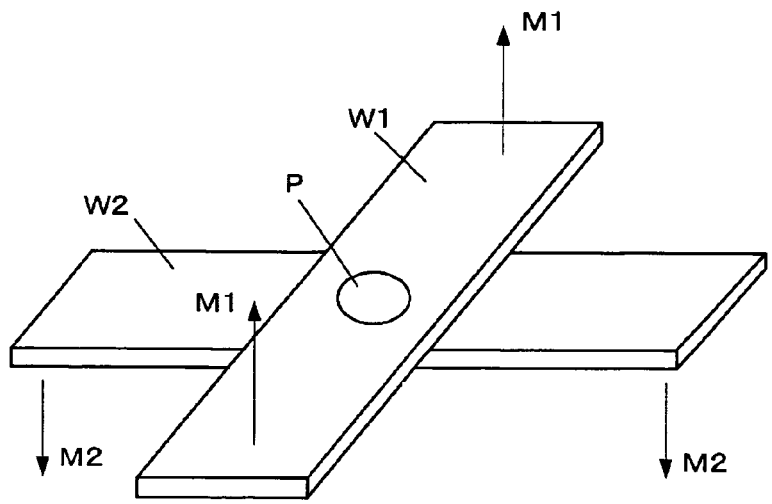
FIG. 16 is a perspective view describing a cross-draw testing.
FIG. 17 is a table showing conditions for joining in the cross-draw testing.
Figure 18:
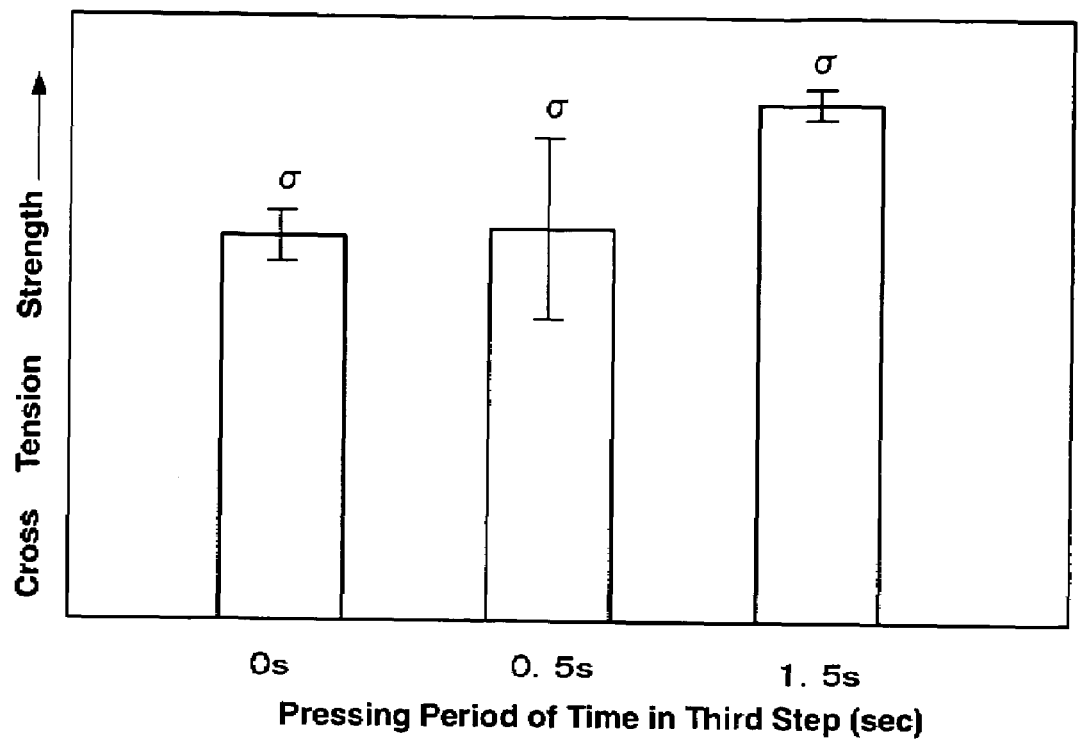
FIG. 18 is a graph of measurement results of the cross-draw testing.

Next, a joining-strength testing was conducted for the work made by this frictional joining method, in which the different kinds of metal members of the first metal member (aluminum plate) W1 and the second metal member (steel plate) W2 are joined, with the third step pressing period of times of 0.0 sec, 0.5 sec, and 1.5 sec. First, a cross-draw testing illustrated in FIG. 16 was used for the joining-strength testing. Herein, the first and second metal members W1, W2 are overlapped with a cross shape and cramped, and then the frictional joining was applied to the joining portion P at the center of a cross portion from the first metal member W1. Subsequently, the first metal member W1 is drawn in an upward direction M1 and the second metal member W2 is drawn in a downward direction M2. Thus, the draw force (cross tension strength) was measured the metal members W1, W2 are separated by drawing them that way. Conditions for joining are shown in FIG. 17, and measurement results of the cross tension strength are shown in FIG. 18. The results of FIG. 18 shows the average measurement values of the cross tension strength that were obtained through three times of measurements in the above-described cross-draw testing, in which the 6000-based aluminum alloy plate (1.4 mm thick) was used for the first metal member W1 and the zinc plating steel plate (1.0 mm thick) was used for the second metal member W2.

The measurement results of the cross tension strength in FIG. 18 shows the cross tension strength in the case where there was the longer pressing period of time in the third step was greater than that in the case where there was the shorter pressing period of time in the third step, but the necessary joining strength was maintained in any cases. Also, the standard deviation of cross tension strength $\sigma$, which is shown along the axis of ordinate of the graph, shows that the longer the pressing period of time in the third step was, the smaller the value $\sigma$ was, which means that the deviation of cross tension strength, namely the joining strength, became smaller, so the constant quality level was maintained.

Since the third step pressing can maintain the heating of the upper plate W1 for the specified period of time after the second step pressing, the joining with the sufficient plastic flow at the upper plate W1 can be done. Also, the joining strength can be prevented from decreasing due to the attachment of the upper plate W1 to the rotational tool 16 (herein, the longer pressing period of time in the third step would be better).

Next, the joining-strength testing was conducted for the work made by this frictional joining method, in which the different kinds of metal members of the first metal member (aluminum plate) W1 and the second metal member (steel plate) W2 are joined, with the third step pressing period of times of 0.0 sec, 0.5 sec, and 1.5 sec.

Figure 19:
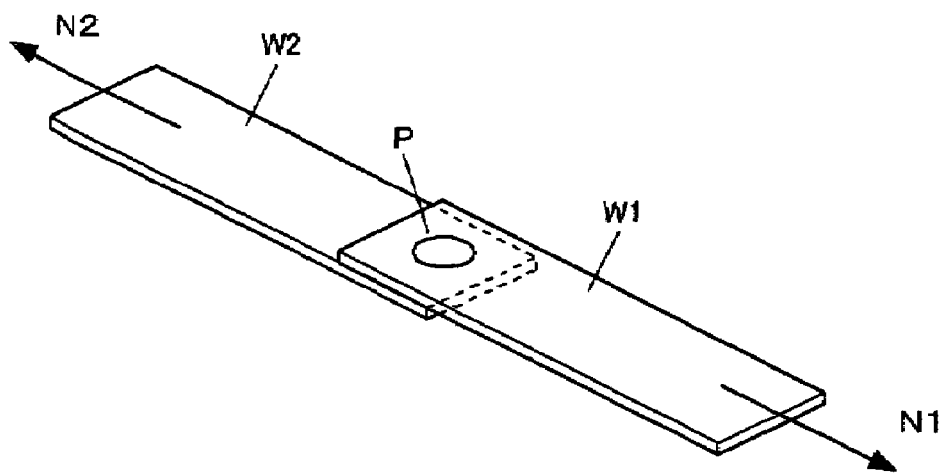
FIG. 19 is a perspective view explaining a draw-shear testing

In this joining-strength testing, the draw-shear testing as illustrated in FIG. 19 was conducted. Herein, the first and second metal members W1, W2 are overlapped partially and cramped, and then the frictional joining was applied to the joining portion P from the first metal member W1. Subsequently, the first metal member W1 was drawn in a direction of arrow N1 and the second metal member W2 was drawn in a direction of arrow N2. Thus, the draw force (shearing force) was measured when the metal members W1, W2 are separated by drawing them that way. The measurement results are shown in FIG. 20. The results of FIG. 20 shows the average measurement values of the shear strength that were obtained through three times of measurements in the above-described draw-shear testing, in which, like the above-described cross-draw testing, the 6000-based aluminum alloy plate (1.4 mm thick) was used for the first metal member W1 and the zinc plating steel plate (1.0 mm thick) was used for the second metal member W2. The joining conditions shown in FIG. 17 were used like the above-described cross-draw testing.

According to the measurement results of the shear-strength, as shown in FIG. 20, the shear-strength in the case where the pressing period of time in the third step was 0.5 sec or 1.5 sec was greater than that in the case where the pressing period of time in the third step was 0 sec, namely in the case where no pressing was conducted in the third step, so the joining strength was maintained.

Since the third step pressing with the pressing period of time of 0.5 sec or 1.5 sec can maintain the heating of the upper plate W1 for the specified period of time after the second step pressing, the joining with the sufficient plastic flow at the upper plate W1 can be done. Thus, the joining strength can be prevented from decreasing due to the attachment of the upper plate W1 to the rotational tool 16.

Next, for four samples of the work comprised of the first metal member (aluminum alloy) W1 and the second metal member (steel plate) W2, the shear strength, i.e., the joining strength, of the first and second metal members W1, W2 was measured by the above-described draw-shear testing, in which the pressing force, the rotational speed and the pressing period of time of the rotational tool 16 in the first, second and third steps were changed within respective specified ranges. The joining conditions of the draw-shear testing are shown in FIG. 21, and the measurement results of the shear strength are shown in FIG. 22. Herein, the following samples were used: a 6000-based aluminum alloy A (with copper, 0.7 mm thick) of the upper plate W1 and a zinc plating steel plate (1.2 mm thick) of the lower plate W2; a 6000-based aluminum alloy A (with copper, 0.8 mm thick) of the upper plate W1 and a zinc plating steel plate (1.2 mm thick) of the lower plate W2; a 6000-based aluminum alloy B (without copper, 1.4 mm thick) of the upper plate W1 and a zinc plating steel plate (1.4 mm thick) of the lower plate W2; a 6000-based aluminum alloy A (with copper, 1.4 mm thick) of the upper plate W1 and a zinc plating steel plate (1.0 mm thick) of the lower plate W2. For these four samples were conducted the shear-strength tests 1 through 25.

As apparent from the measurement results in FIG. 22, in the cases with NG (not good) indicated in measurement result columns where the pressing force in the second step was too large regardless of the relatively small thickness of the upper plate W1 (tests 4, 8 and 9), the tip of the pin portion 16c contacted the lower plate W2, penetrating through the upper plate W1, because the upper plate W1 had been softened too much, so the torn-off situation of the aluminum of the upper plate W1 attached was caused. Also, in the case where the pressing force in the first step was too small (test 10), the softening by the tip of the pin portion 16c was not so enough that the rotational tool 16 could not be pressed properly against the upper plate W1 in the subsequent step and thus the shear strength did not become sufficient.

Meanwhile, judging from the cases where the measurement results were OK (good), namely, the shear strength was beyond the standard strength (from the B-grade data of JIS), the preferable ranges of the pressing forces were such that the pressing force in the first step was 1.47 kN or more and 3.43 kN or less, the pressing force in the second step was 1.74 kN or more and 5.88 kN or less, and the pressing force in the third step was 0.49 kN or more and 1.47 kN or less. Also, the preferable ranges of the joining period of time were such that the joining period of time in the first step was 1.0 sec-2.5 sec, the joining period of time in the second step was 1.0 sec-1.5 sec, and the joining period of time in the third step was 0.5 sec-2.5 sec.

FIG. 23 is a graph showing relationships between the pressing force in the third step and the shear strength. It is apparent from this graph that the third step pressing force of 0.49 kN or more and 1.47 kN or less showed the proper shear strength, i.e., the proper joining strength.

Herein, in the case where the pressing force in the third step was less than 0.49 kN, the pressing force was so small that the sufficient plastic flow at the upper plate W1 was not generated by the frictional heat and thereby the shear strength was not sufficient. Accordingly, in the case where the pressing force in the third step was more than 1.47 kN, the possibility that the tip of the pin portion 16c of the upper plate W1 contacts the lower plate W2 because the upper plate W1 had been softened too much would increase, so that the possibility that the torn-off situation of the aluminum attached to the rotational tool 16 would occur increases.

According to the results described above, the setting of the pressing force in the third step within the proper range described above can surely prevent the shear strength, i.e., the joining strength, from reducing improperly due to the torn-off situation of the upper plate W1.

Figures 24, 25:
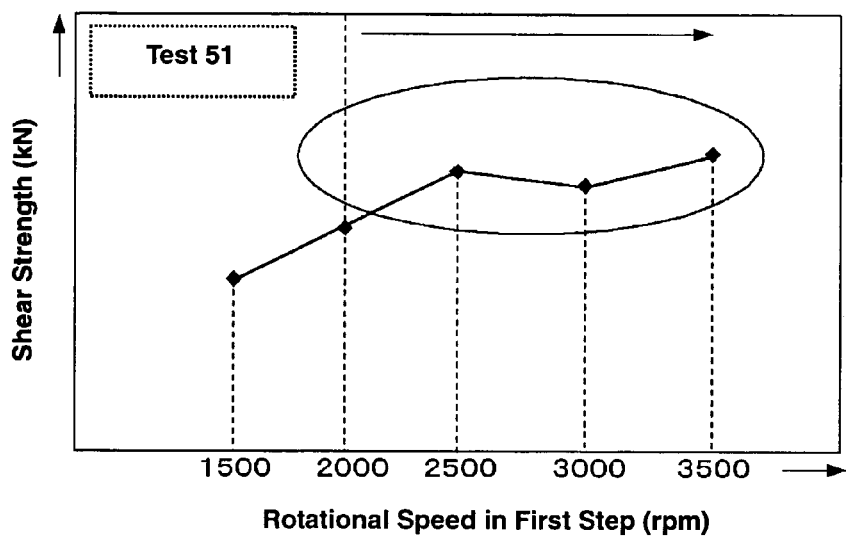
FIG. 24 is a table showing conditions for joining in which the rotational speed of the rotational tool at respective pressing in the first, second and third steps were changed within a specified range.
FIG. 25 is a graph of measurement results of the draw-shear testing of joining in which the rotational speed of the rotational tool at pressing in the first step were changed within a specified range.

Next, the draw-shear testing (tests 51, 52 and 53) for the 6000-based aluminum alloy (1.4 mm thick) of the upper plate W1 and the zinc plating steel plate (1.0 mm thick) of the lower plate W2 was conducted under the joining conditions that the pressing forces and pressing period of time for the pressing in the first through third steps were set at constant values respectively, while the rotational speeds in the first through third steps were changed respectively within the rage of 1500 rpm-3500 rpm. FIG. 24 shows the joining conditions.

Figure 26:
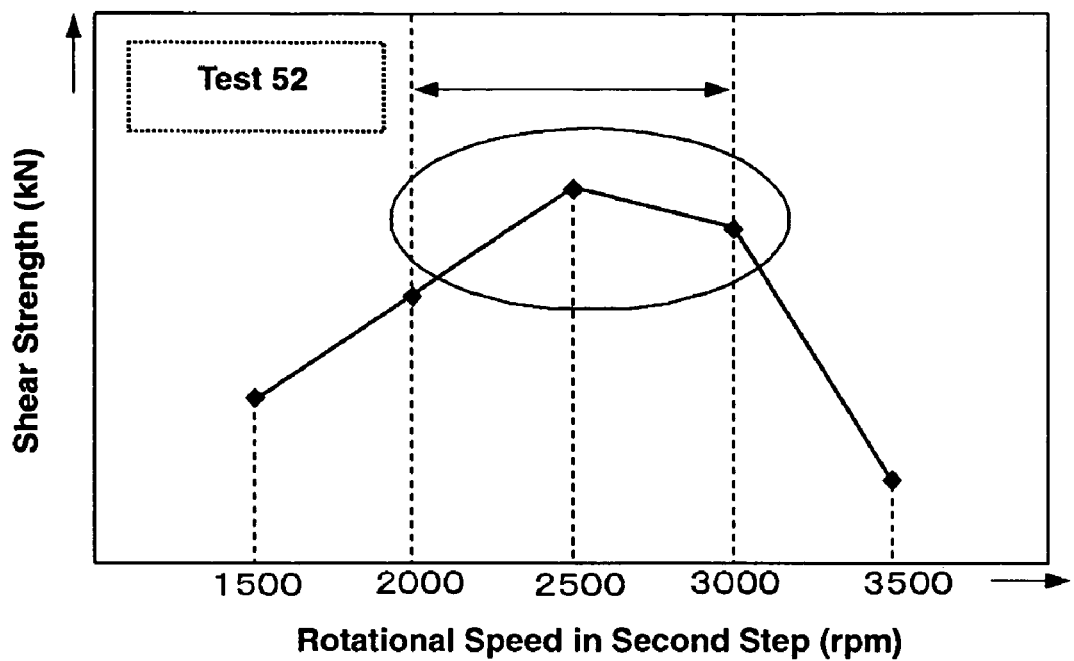
FIG. 26 is a graph of measurement results of the draw-shear testing of joining in which the rotational speed of the rotational tool at pressing in the second step were changed within a specified range.
Figure 27:
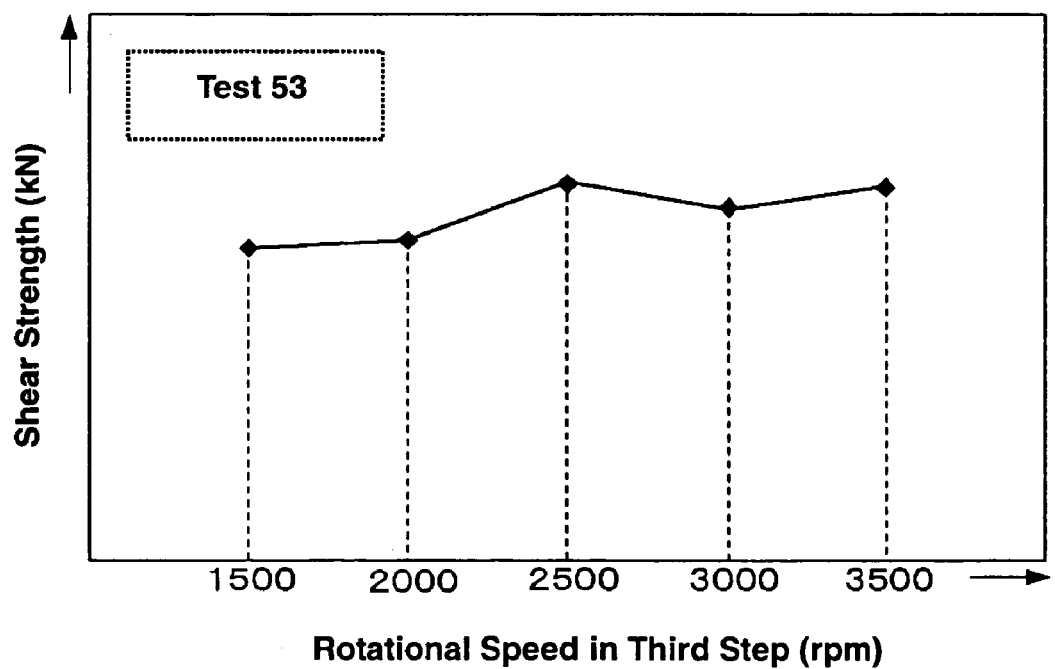
FIG. 27 is a graph of measurement results of the draw-shear testing of joining in which the rotational speed of the rotational tool at pressing in the third step were changed within a specified range.

FIG. 25 is a graph of measurement results of the draw-shear testing (test 51) of joining in which the rotational speeds in the first step were changed within the specified range, FIG. 26 is a graph of measurement results of the draw-shear testing (test 52) of joining in which the rotational speeds in the second step were changed within the specified range, and FIG. 27 is a graph of measurement results of the draw-shear testing (test 53) of joining in which the rotational speeds in the third step were changed within the specified range.

It is apparent from the results of FIG. 25 (test 51) that the rotational speed of more than 2000 rpm and 3500 rpm or less (speed range enclosed by an oval in the figure) in the first step pressing showed the proper draw-shear strength. The reason for this seems that the upper plate W1 was softened to a certain degree by the relative movement of the tip of the pin portion 16c and then the plastic flow at the upper plate W1 was surely generated by the pressing in the second and third steps, so that the proper shear strength could be obtained. When the rotational speed was 2000 rpm or less, however, the upper plate W1 was not softened sufficiently by the rotational movement of the tip of the pin portion 16c and thereby the rotational tool 16 was not pressed enough against the upper plate W1 by the pressing in the second and third steps, so that the proper shear strength could not be obtained.

It is apparent from the results of FIG. 26 (test 52) that the rotational speed of more than 2000 rpm and 3000 rpm or less (speed range enclosed by an oval in the figure) in the second step pressing showed the proper draw-shear strength. When the rotational speed was 2000 rpm or less, the frictional force between the upper plate W1 and the rotational tool 16 increased greatly and thereby the rotational torque was increased, so that the energy consumption of the joining apparatus becomes large. When the rotational speed was more than 3000 rpm and 3500 rpm or less, the frictional force between the upper plate W1 and the rotational tool 16 was relatively low, and thereby the upper plate W1 was not be softened properly by the frictional heat and the plastic flow was not generated sufficiently, so that the proper shear strength could not be obtained.

It is apparent from the results of FIG. 27 (test 53) that the rotational speed of 1500 rpm or more and 3500 rpm or less in the third step pressing showed the proper draw-shear strength. When the rotational speed was less than 1500 rpm, the frictional force between the upper plate W1 and the rotational tool 16 increased greatly and thereby the rotational torque was increased, so that the energy consumption of the joining apparatus becomes large.

Accordingly, it is apparent that the preferable ranges of the rotational speed were such that the rotational speed for the first step pressing was more than 2000 rpm and 3500 rpm or less, the rotational speed for the second step pressing was more than 2000 rpm and 3000 rpm or less, and the rotational speed for the third step pressing was 1500 rpm or more and 3500 rpm or less.

Next, it was tested how the rotational speed, the pressing force and the kind of material of the first metal member W1 in the third step pressing affect the temperature of the first and second metal members W1, W2. The same measurement method illustrated in FIG. 13 was used. Namely, there was provided the work W comprised of the first metal member W1 as the upper plate and the second metal member W2 as the lower plate that lap over, and two thermocouples were inserted from the second metal member W2 and placed at the center of the joining portion P of the second metal member W2 to measure the changing of the temperature. The joining conditions are as follows: the pressing force of 1.47 kN, the rotational speed of 3500 rpm, the pressing period of time of 1.0 sec for the first step pressing; and the pressing force of 3.92 kN, the rotational speed of 2500 rpm, the pressing period of time of 1.54 sec for the second step pressing, where the joining conditions of the first and second step pressings were not changed. Meanwhile, the joining conditions for the third step pressing were the pressing force of 0.98 kN, the rotational speed of 2500 rpm, and the pressing period of time of 2.4 sec, where the joining conditions of the third step pressing were changed at need. Herein, the 6000-based aluminum alloy (1.4 mm thick) of the upper plate W1 and the zinc plating steel plate (1.0 mm thick) of the lower plate W2 were used to test the influence by the rotational speed and the pressing force in the third step.

Figure 28:
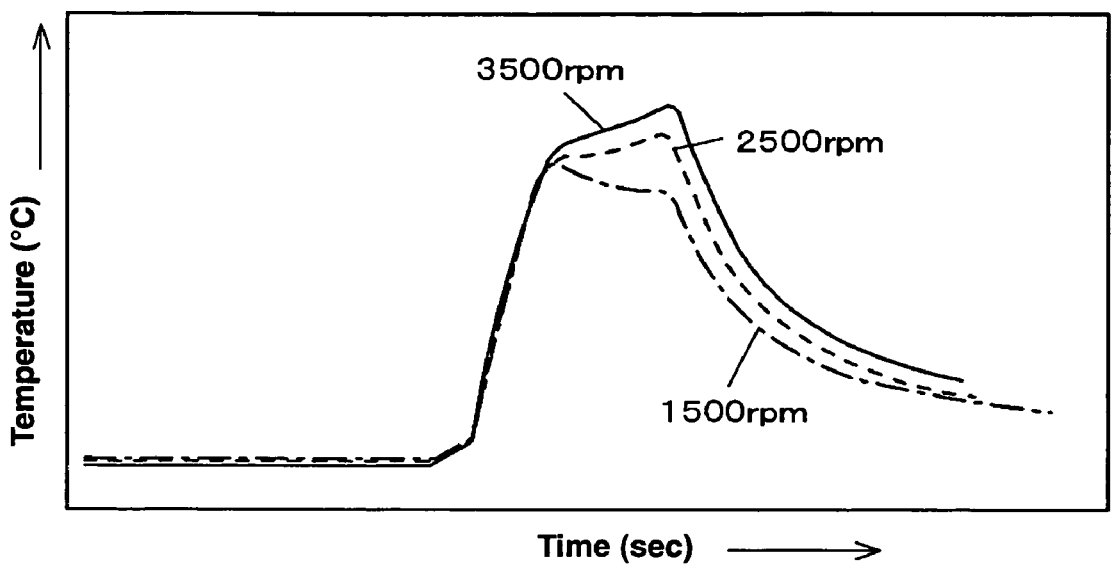
FIG. 28 is a graph showing relationships between the rotational speed of the rotational tool and the temperature of the work at pressing in the third step.
Figure 29:
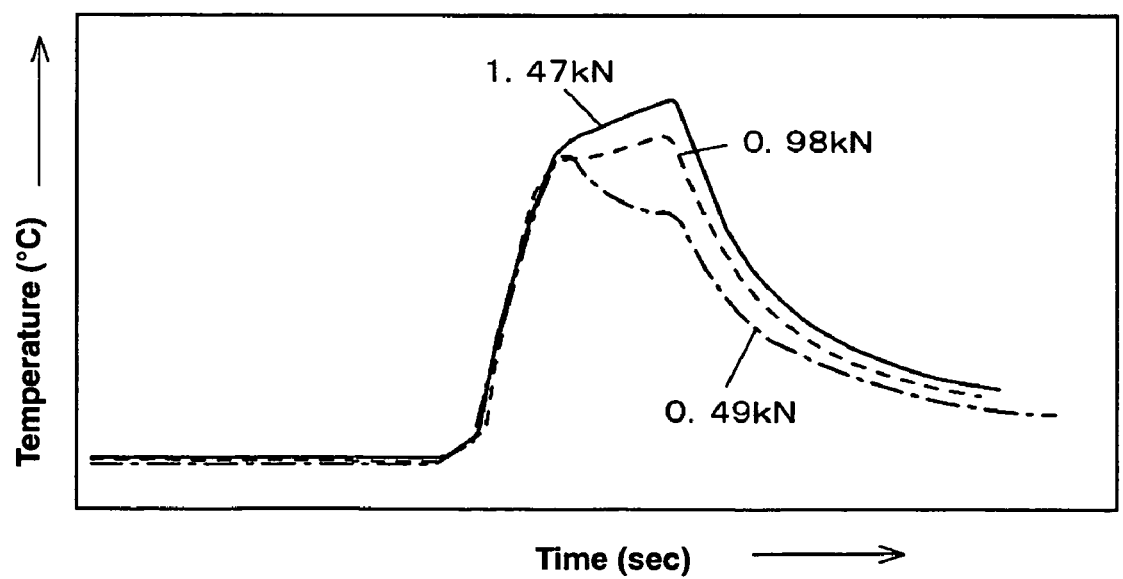
FIG. 29 is a graph showing relationships between the pressing force and the temperature of the work at pressing in the third step.
Figure 30:
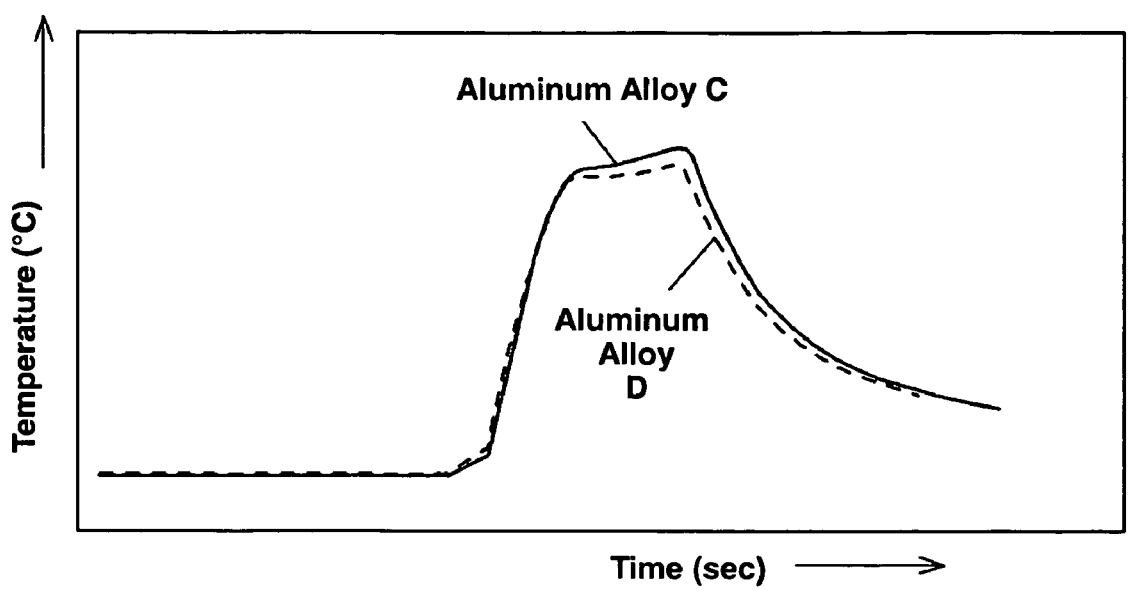
FIG. 30 is a graph showing relationships between the kind of material of the upper plate and the temperature of the work.

FIGS. 28, 29 and 30 are graphs respectively showing relationships between the rotational speed, the pressing force, the kind of material of the upper plate W1 and the temperature of the first and second metal members W1, W2 at the pressing in the third step.

It was found, as apparent from FIG. 28, that there was a tendency that the greater the rotational speed of the pressing in the third step was, the higher the temperature of the first and second metal members W1, W2 (temperature at the joining portion P) was. It was also found that the temperature did not increase as the penetration of the rotational tool 16 occurred (at 3500 rpm), and that the temperature did not decrease as the proper plastic flow at the first metal member W1 was prevented (at 1500 rpm).

It was found, as apparent from FIG. 29, that there was a tendency that the greater the pressing force of the pressing in the third step was, the higher the temperature of the first and second metal members W1, W2 (temperature at the joining portion P) was. It was also found that the temperature did not increase as the penetration of the rotational tool 16 occurred (at 1.47 kN), and that the temperature did not decrease as the proper plastic flow at the first metal member W1 was prevented (at 0.49 kN). Also, it was found from FIG. 30 that there was no big difference in the temperature of the first and second metal members W1, W2 (temperature at the joining portion P) between the case where a 6000-based aluminum alloy C (without copper, 1.4 mm thick) of the upper plate W1 was used and the case where a 6000-based aluminum alloy D (with copper, 1.4 mm thick) of the upper plate W1 was used.

The above-described embodiment just discloses the preferred embodiment, but any other modifications and improvements can be applied within the scope of a spirit of the present invention. For example, although the single pressing force was applied to the rotational tool in each step in the above-described embodiment, plural pressing forces may be applied stepwise or the pressing force may be changed within the preferable range.

What is claimed is:

1. A frictional spot joining method of metal members, in which a work comprising a first metal member and a second metal member that lap over is provided, a melting point of the second metal member being higher than that of the first metal member, and a rotational tool is pushed against the work from a side of the first metal member and the first metal member is softened and made in a plastic flow state by a frictional heat generated through a rotational and pressing operation of the rotational tool, the frictional spot joining method comprising:

a step of providing the rotational tool that comprises a shoulder portion to face the work and a pin portion that is located on a rotational axis of the rotational tool and projects toward the work from the shoulder portion;

a first step of pushing the rotational tool under rotation with a first pressing force until the first metal member is softened by the rotational tool whose pin portion or both pin portion and shoulder portion come into the first metal member;

a second step of pushing the rotational tool under rotation with a second pressing force that is greater than the first pressing force until a tip of the pin portion of the rotational tool reaches a specified point that is at a distance from a joining face of the first and second metal members; and a third step of maintaining the pressing force of the rotational tool under rotation at a third pressing force that is smaller than the second pressing force until a specified period of time elapses after the tip of the pin portion has reached said specified point that is at the distance from the joining face;

wherein said first pressing force is 1.47 kN or more and 3.43 kN or less, said second pressing force is 1.74 kN or more and 5.88 kN or less, and said third pressing force is 0.49 kN or more and 1.47 kN or less.

2. The frictional spot joining method of claim 1, wherein said rotational tool is rotated at a specified rotational speed within a middle rotational speed through a high rotational speed in said first step, at the middle rotational speed in said second step, and at a specified rotational speed within a low rotational speed through the high rotational speed in said third step.

3. The frictional spot joining method of claim 2, wherein said rotational tool is rotated at a specified rotational speed that is more than 2000 rpm and 3500 rpm or less in said first step, at a specified rotational speed that is more than 2000 rpm and 3000 rpm or less in said second step, and at a specified rotational speed that is 1500 rpm or more and 3500 rpm or less in said third step.

4. The frictional spot joining method of claim 1, wherein said rotational tool comprises a ring-shaped concave that is formed at the shoulder portion around the pin portion.

5. The frictional spot joining method of claim 4, wherein said ring-shaped concave formed at the shoulder portion is a recess with a cone shape that has a center thereof aligning with the rotational axis of the rotational tool.

6. The frictional spot joining method of claim 1, wherein said first metal member is made of aluminum alloy, said second metal member is made of steel, and both metal members are joined in a solid state at a joining boundary face thereof.

* * * * *